US006104819A

United States Patent [19]

Nickum

[11] Patent Number: 6,104,819
[45] Date of Patent: Aug. 15, 2000

[54] COMBINATION SPEAKER AND EARPHONE APPARATUS

[75] Inventor: Larry A. Nickum, Sioux City, Iowa

[73] Assignee: Gateway 2000, Inc., North Sioux City, S. Dak.

[21] Appl. No.: 08/867,242

[22] Filed: Jun. 2, 1997

[51] Int. Cl.[7] .................................................. H02B 1/00
[52] U.S. Cl. .......................................... 381/123; 381/74
[58] Field of Search ............................. 381/1, 123, 74, 381/309, 11, 80, 81

[56] References Cited

U.S. PATENT DOCUMENTS

| | | | |
|---|---|---|---|
| 3,796,840 | 3/1974 | Ohta . | |
| 4,245,136 | 1/1981 | Krauel, Jr. . | |
| 4,455,677 | 6/1984 | Fox . | |
| 4,829,571 | 5/1989 | Kakiuchi et al. . | |
| 5,144,678 | 9/1992 | Lenz . | |
| 5,161,198 | 11/1992 | Noble | 381/81 |
| 5,317,643 | 5/1994 | Patricelli . | |
| 5,917,916 | 6/1999 | Sibbald | 381/123 |

FOREIGN PATENT DOCUMENTS

| | | | |
|---|---|---|---|
| 57-41092 | 3/1982 | Japan | 381/123 |
| 6-113390 | 4/1994 | Japan | 381/123 |

*Primary Examiner*—Minsun Oh Harvey
*Attorney, Agent, or Firm*—Schwegman, Lundberg, Woessner & Kluth, P.A.; Anthony Claiborne

[57] ABSTRACT

An audio transmission apparatus has a primary speaker and a secondary speaker apparatus. Two primary speakers are provided to correspond with the left channel and the right channel. The secondary speaker apparatus is placed on a first surface of the primary speaker. A switching mechanism, such as a micro switch or a proximity sensor, is disposed between the primary speaker and the secondary speaker apparatus such that removal of the secondary speaker apparatus enables the secondary speaker apparatus and disables the primary speaker. Connected by wire or a wireless medium, the secondary speaker apparatus is an earphone, a head set, or an ear bud, depending on the application. The audio transmission apparatus is used in conjunction with any type of audio output device, such as a television, computer, stereo, and the like.

31 Claims, 6 Drawing Sheets

COMBINATION SPEAKER AND EARPHONE APPARATUS

FIELD OF THE INVENTION

The present invention relates generally to audio devices. More particularly, it pertains to an audio apparatus which combines a speaker and an earphone.

BACKGROUND OF THE INVENTION

Sound requires a medium for transmission. Speakers are one conventional method for transmitting sound. Every personal computer has a speaker of some kind in it. The designers of the first PCs provided rudimentary equipment for sound, as the then current applications did not require much sound output, if any. Previously, the most common kind of personal computer speaker was an object approximate 2.5 inches in diameter. Although the size was sufficient to make noise, it fell short on quality, range, and loudness.

Currently, computer applications frequently involve sounds for alerting or entertaining a computer user. Other sound applications include computer software for physically challenged individuals. Computer users are now also using computers for communicating with others in place of telephones, and using computers for video conferences. To really experience a PC, the added sensual dimension of sound is necessary. A multimedia PC extends the computer's capabilities of interacting with the world to include sound. Thus, it is important to have devices which can effectively provide speaker support for these applications.

Personal computers have been provided with small desktop speakers to support the above mentioned applications. Two speakers are sometimes provided for modern stereophonic sound. The speakers take the form of separate boxes which rest on a desk top. Alternatively, the speakers may be integral with a monitor of the computer system.

Many people in offices each have their own personal computer. These people use their computers to do work which may involve use of an internal speaker, or external speakers. However, offices commonly provide work space in the form of cubicle structures to maximize available office space. These structures are provided in close proximity to one another, with open air space near the ceiling area. Many personnel can be seated in a smaller amount of floor space, yet each person may have their own desk and computer space. Given the close proximity of the work spaces, sound easily travels from one cubicle to another. Sound generated by one person's computer may distract or annoy another person working at a nearby cubicle, particularly if frequent sounds are generated by the computer, or if a particular computer user requires sound intense software programs.

One solution to this problem is to provide earphones for the individual computer operator. Earphones operate similar to speakers. However, the output device is much smaller. The earphone is shaped to cover an ear, and provides sufficient output sound for only the user to hear when the device is placed proximate to the ear. As a result, a user seated in an adjacent cubicle is no longer disturbed by the noise generated to the output device.

To use the earphones, the operator connects the earphones by inserting the earphone plug into an audio output device which in many cases turns off or disables audio output from being sent to the speakers. For personal computers, the plug is located in a rear portion of the computer. When reaching toward this rear portion, the operator must fumble with the other cables and wires connecting other peripheral devices, such as the monitor, mouse, keyboard and the like, as well as the cord providing electricity to the computer. Since the operator must plug the earphone into the rear portion of the computer, the operator may not directly look at where the device is being inserted. As result, the operator may attempt to insert the plug into a hole not intended for this plug and cause damage to the computer.

Furthermore, finding the appropriate plug is time consuming and tedious. If an operator frequently changes between speakers and earphones, finding the plug in the rear portion can consume valuable working time. Also, if a telephone conversation was being held using a speaker, and the conversation suddenly becomes one not meant to be overheard by others, the operator would have no way to quickly switch to the earphone assembly. When the operator is finished using the earphones, the operator must again fumble with cables and wires located behind the device to unplug the earphones. Alternatively, an operator could wear the earphones all day long, but this impractical and uncomfortable to the operator.

Another approach is found in U.S. Pat. No. 5,144,678 issued to Lenz on Sep. 1, 1992. Lenz teaches providing a headset which automatically turns on when placed on a users head. However, this type of headset yields many disadvantages. The headset is not able to be used in conjunction with other speakers. The switch of the headset only turns the headset on or off. The large, bulky headset is impractical for an office application as it appears unprofessional and would require a large amount of storage space during periods of non-use. The sizable ear muffs fully cover the such that the ears are sealed off from the environment, which reduces the hearing ability of a user.

Another solution is to provide a plug on the speakers into which the head phones are inserted. However, the user must still insert the plug into the speaker to use the head phones, and remove when switching to the speaker. The head phones could become displaced, and also require storage space on a desk or in a drawer.

Accordingly, what is needed is a way to facilitate switching from one type of speaker device to another. What is further needed is way to switch in a faster, more convenient manner.

SUMMARY OF THE INVENTION

An audio transmission apparatus is provided having a primary speaker and a secondary speaker. The secondary speaker is placed on a first surface of the primary speaker. A switching mechanism, such as a micro switch or a proximity sensor, is disposed between the primary speaker and the secondary speaker such that removal of the secondary speaker enables the secondary speaker and disables the primary speaker. In one embodiment, the secondary speaker is an earphone. In another embodiment, a plurality of secondary speakers are provided in a headset. The secondary speakers may either be connected with the primary speaker using wire or a wireless medium.

Pertaining to another embodiment of the audio transmission apparatus, two primary speakers are each provided with a secondary speaker, such as an earphone. The secondary speakers are disposed on a surface of the primary speakers with a switching mechanism disposed in between. The audio transmission apparatus also includes a device for transmitting sound such as a television, a stereo receiver, a portable radio, or a personal computer. For additional convenience, the output device for connection with the audio transmission apparatus can be provided on a front portion of the personal computer.

Another embodiment of the audio transmission apparatus includes left and right channel desk-top speakers each having a recess with a switching mechanism therein. Left and right channel earphones are seated within the recess, and when removed, actuate the earphones. The earphones further include an attachment device where a user can attach the earphones to their ear. For added user comfort, the earphones are provided with a cushion. A cutout is provided proximate to each recess to facilitate easy removal of the earphones.

The audio transmission device provides a mechanism for a user to easily alternate between speakers and earphones. The user no longer will need to fumble with cables and wires typically situated behind a computer or a stereo system. Furthermore, a user can limit the amount of noise produced in the office with little effort.

BRIEF DESCRIPTION OF THE DRAWINGS

In the drawings, like numerals describe like components throughout the several views.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1A:
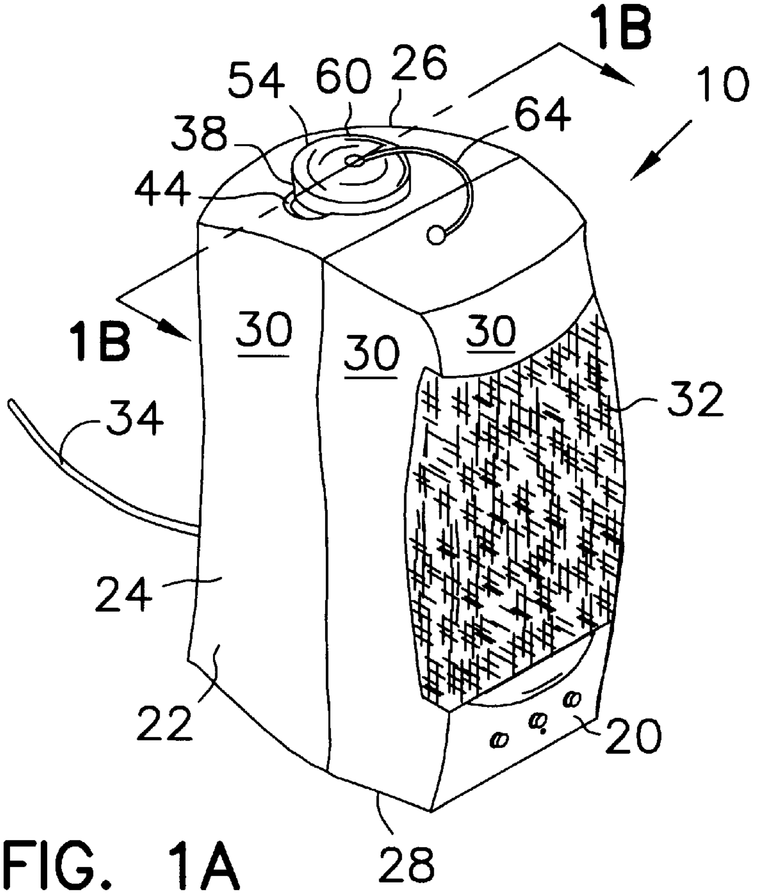
FIG. 1A is a perspective view illustrating an audio device constructed in accordance with one embodiment of the present invention.

An audio transmission apparatus 10 is illustrated in FIG. 1A. Generally, the audio transmission apparatus 10 includes a first primary speaker 20 coupled with a first secondary speaker 54. The first secondary speaker 54 is removably seated with the first primary speaker 20. The audio transmission apparatus 10 is capable of connecting with many audio output devices, which provide audio signals to the audio transmission apparatus 10.

The first primary speaker 20 is encompassed by a first speaker body 24 having an outer peripheral surface 22. The first speaker body 24 is defined by a top surface 26, a bottom surface 28, and side surfaces 30. As will be evident herein to those of ordinary skill in the art, the surfaces 26 and 28 are arbitrarily described as top and bottom surfaces for convenience of description only and not intended to limit the orientation of the audio transmission apparatus 10 in any way. The terms "top" and "bottom" refer to one orientation where the bottom surface 28 of the speaker rests on a base surface, such as a desk, but are not intended in a restrictive sense. As obvious to those skilled in the art, a speaker system incorporating the present invention can rest on any surface of its outer periphery. Alternatively, a holding or support device such as a platform could be used in conjunction with the speakers, or the primary speakers could be formed integrally with other known devices, such as electric keyboards or portable stereos.

The first primary speaker 20 generally has a rectangular box shape, although other shapes, such as a cylinder, would also be appropriate to incorporate with the present invention. The top and bottom surfaces 26, 28 are generally parallel to one another, and the primary speaker 20 rests on the bottom surface 28. The side surfaces 30 generally have a rectangular cross-section, although they may have rounded edges or alternatively shaped cross-sections. Disposed on one or more of the side surfaces 30 is a grill 32, which is typically comprised of a mesh-like material. The first primary speaker 20 is sized for placement atop a desk, such that significant space is not consumed by the footprint of the first primary speaker 20. Alternatively, the first primary speaker 20 could be in the form of a bookshelf speaker or a floor speaker when used in environments typically other than an office or for audio output devices other than a computer.

The first primary speaker 20 is configured to connect with audio output devices, such as a computer (FIGS. 5A and 5B) or a stereo. A cable 34 is provided, preferably on one of the side surfaces 30 of the first primary speaker 20. The cable 34 provides the electrical connection between the first primary speaker 20 and an audio output device (not shown) such that audio signal is provided to the primary speaker 20.

Figure 3:
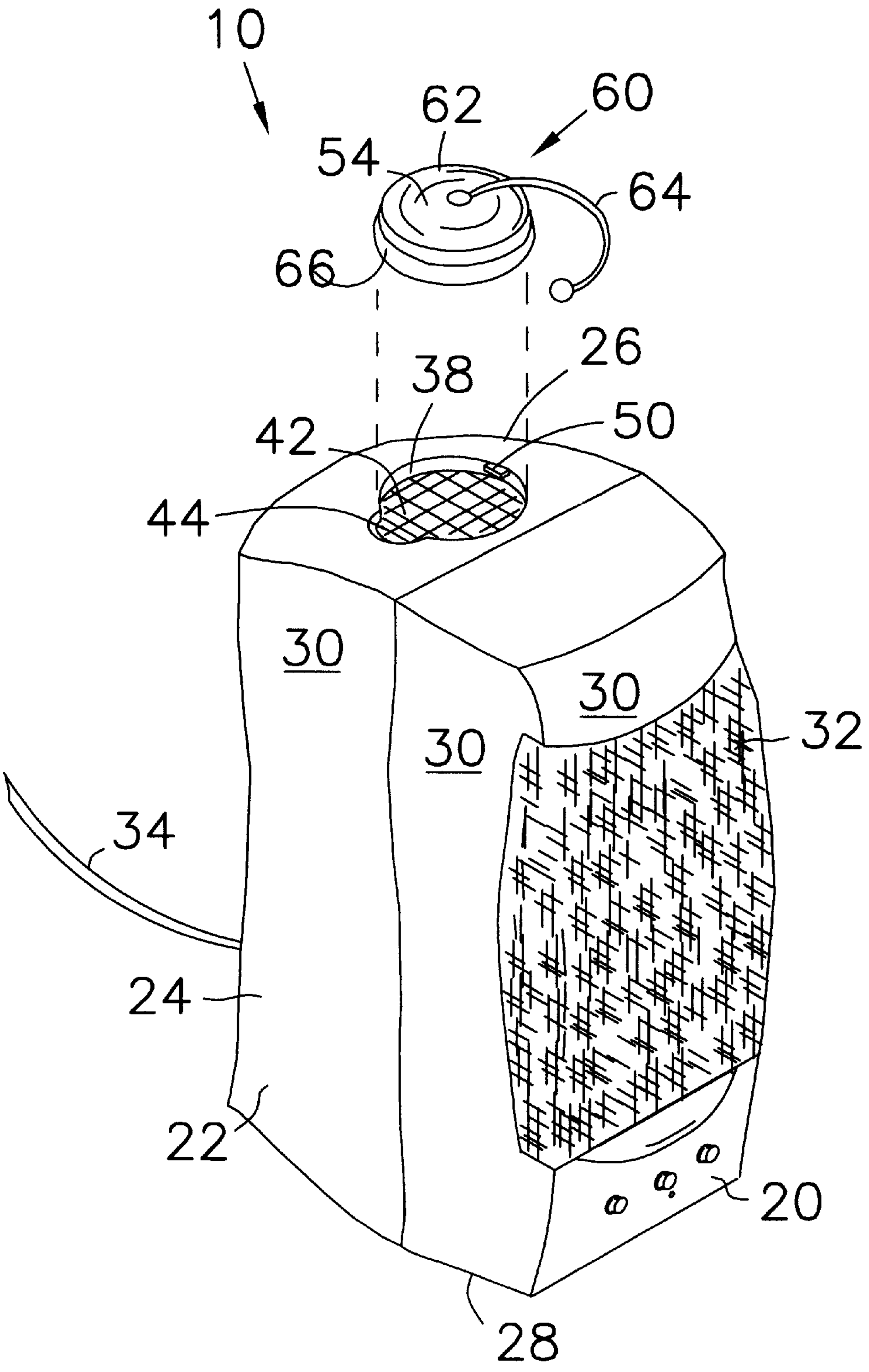
FIG. 3 is a perspective view illustrating an audio device constructed in accordance with yet another embodiment of the present invention.
Figure 4:
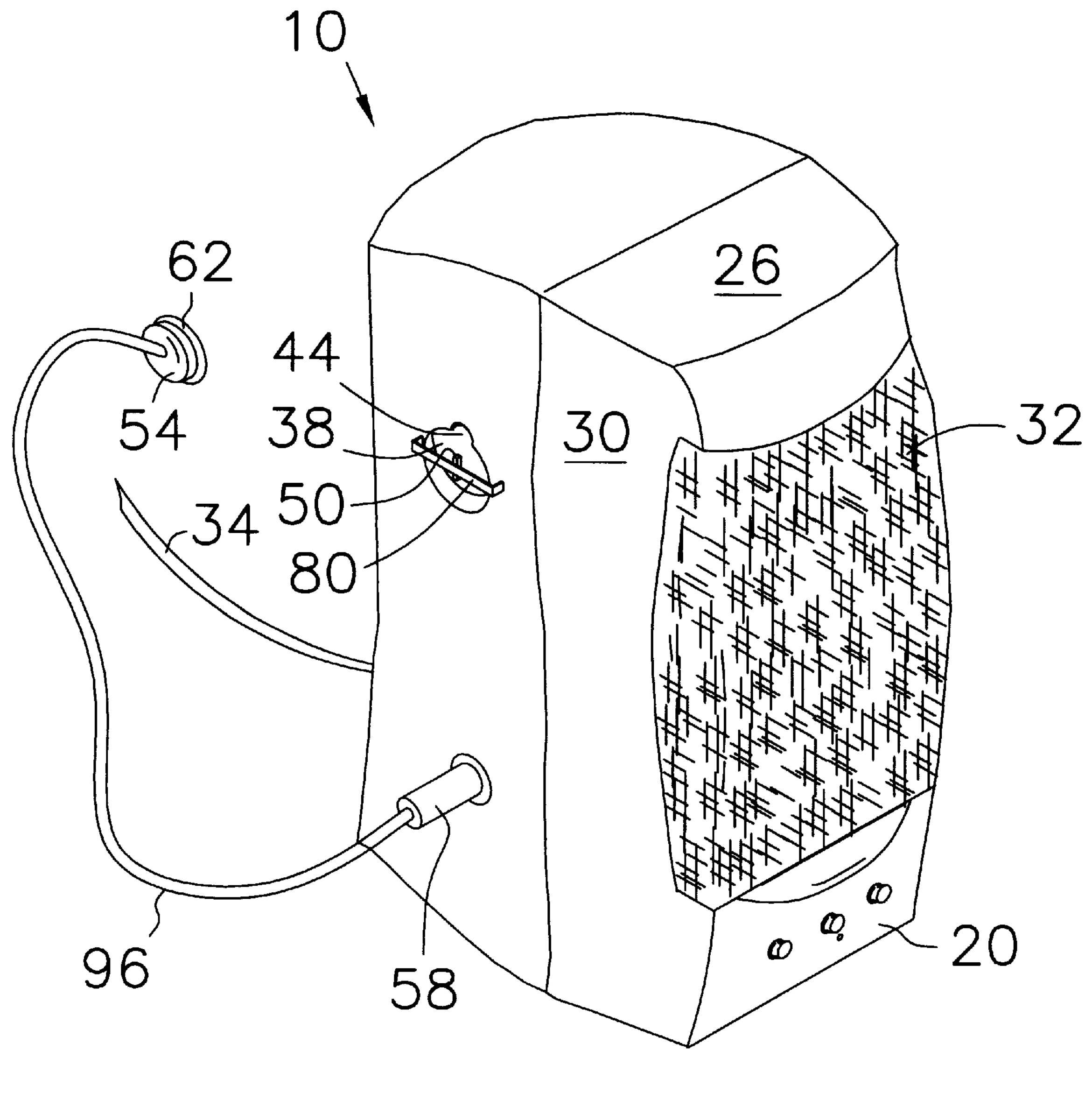
FIG. 4 is a perspective view illustrating an audio device constructed in accordance with another embodiment of the present invention.

As shown more clearly in FIG. 3, the top surface 26 of the first speaker body 24 has a recess 38 in a generally central portion of the top surface 26. The recess 38 generally conforms to the shape of the secondary speaker 54 and is defined in part by a lower recess surface 42. Alternatively, the recess 38 can be provided on a side surface, as shown in FIG. 4. For mounting in either a top surface or a side surface, a retaining member 80 is disposed over a portion of the recess 38 for retaining the secondary speaker 54 therein.

Figure 1B:
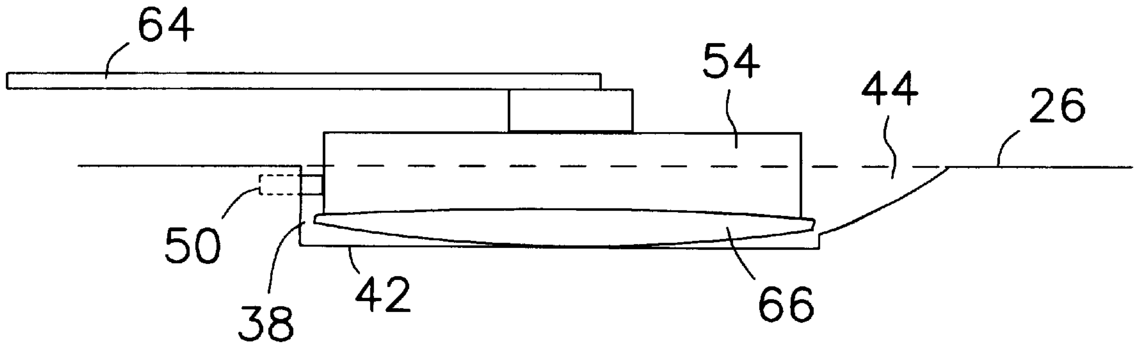
FIG. 1B is an enlarged elevational view taken along 1B—1B of FIG. 1A illustrating an audio device constructed in accordance with one embodiment of the present invention.

Disposed within the recess 38 is a switching mechanism 50, as shown more particularly in FIG. 1B. The switching mechanism 50 is affixed proximate to the lower recess surface 42. Alternatively, the switching mechanism 50 can be affixed to the lower recess surface 42. The switching mechanism 50 is shown at an outer perimeter point of the recess 38, although the mechanism 50 can be disposed at any location within the recess. A micro switch, photo sensor, or a proximity sensor is incorporated in or is coupled to the switching mechanism 50 of the audio transmission apparatus 10, although other sensing and switching devices can be used without departing from the scope of the invention. The switching mechanism 50 senses the presence or absence of the secondary speaker 54 and disables and enables the primary speaker 20 when actuated by the first secondary speaker 54.

In another embodiment, the top surface 26 of the first primary speaker 20 also has a cutout 44 therein, disposed adjacent to the recess 38. Alternatively, the cutout 44 is disposed in a side surface 30, as shown in FIG. 4. The cutout 44 is sized to receive therein an instrument to facilitate removal of the secondary speaker 54. Preferably, the cutout 44 is sized to receive a finger therein.

The secondary speaker 54 is stored within the recess 38 of the first primary speaker 20 during use of the first primary speaker 20. The recess 38 is sized to receive the secondary speaker freely therein. In one embodiment, the depth of the recess 38 is such that a top surface of the secondary speaker is substantially flush with the top surface 26 of the first primary speaker 20. Alternatively, the secondary speaker 54 is coupled with the first primary speaker 20 in other manners. For instance, the secondary speaker 54 rests upon a surface of the first primary speaker with a switch in between, or the secondary speaker 54 has a clip which hangs on the switch of the first primary speaker 20. The switch of the first primary speaker 20 detects the presence or the absence of the secondary speaker 54.

When disposed in the recess 38, the secondary speaker 54 rests against the switching mechanism 50. When seated in this position, the secondary speaker 54 causes the switching mechanism 50 to be actuated in a first position which enables the first primary speaker 20. When removed, the secondary speaker 54 causes the switching mechanism to be placed in an alternative actuated position where the first primary speaker 20 is disabled, and the secondary speaker 54 is enabled.

As illustrated in FIG. 4, the secondary speaker 54 is connected with the primary speaker 20 by a wire 96. The wire transmits audio signals from the primary speaker 20 to the secondary speaker 54. One embodiment of the audio transmission apparatus 10 includes a plug 58 connected with the wire 96 of the secondary speaker 54. The plug 58 is removable and connects the wire of the secondary speaker 54 with the primary speaker 20. The secondary speaker 54 can be easily replaced when becoming worn or damaged. In another embodiment, the audio signal is transmitted to the secondary speaker 54 using a wireless medium.

Figure 2A:
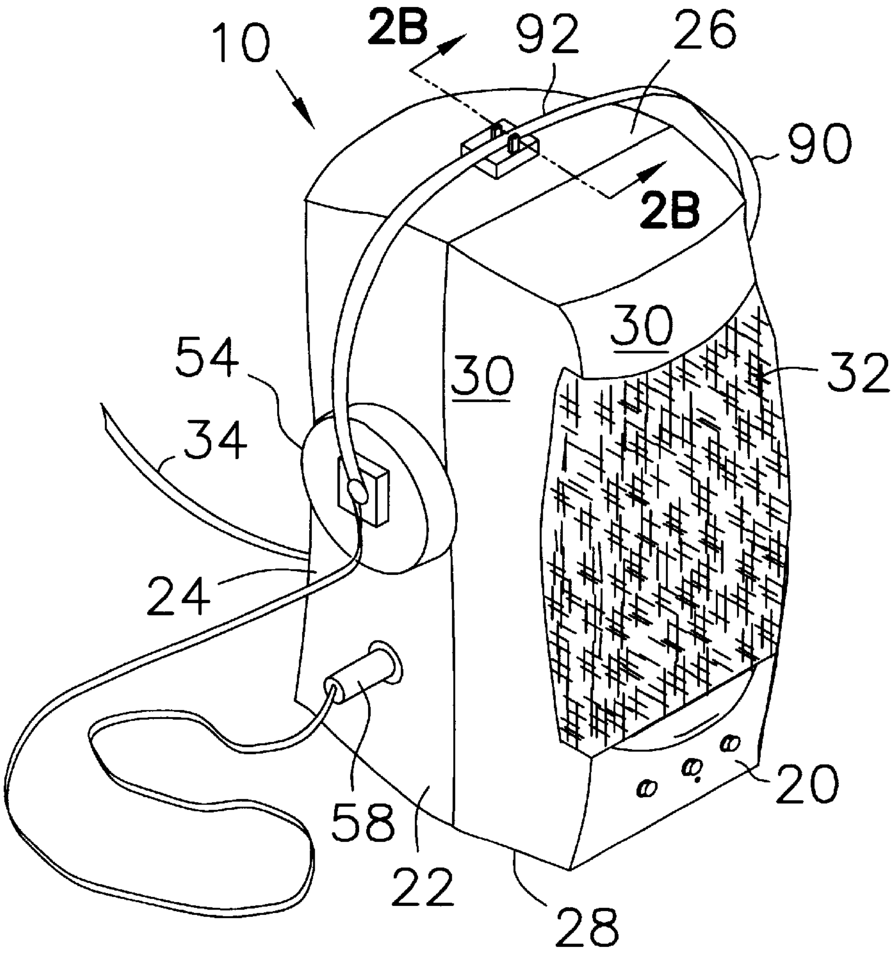
FIG. 2A is a perspective view illustrating an audio device constructed in accordance with another embodiment of the present invention.
Figure 2B:
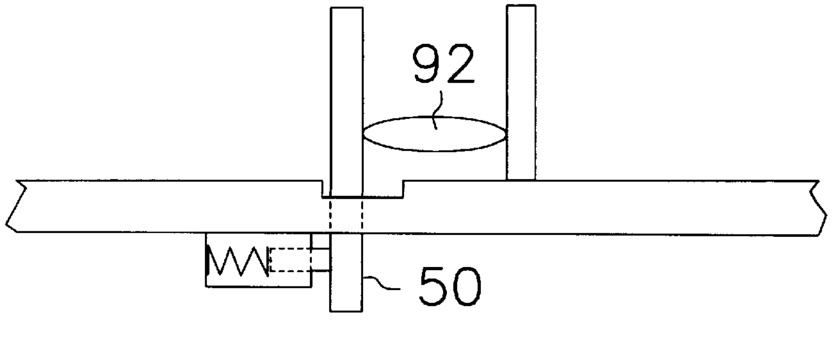
FIG. 2B is an enlarged elevational view taken along 2B—2B of FIG. 2A illustrating an audio device constructed in accordance with one embodiment of the present invention.

In one embodiment, illustrated in FIGS. 2A and 2B, the secondary speaker 54 comprises a headset 90. The headset 90 is coupled with the primary speaker 20 with a plug 58, as described below. The headset 90 includes a head band 92 for placing the headset 90 over the head of a user. The head band 92 of the headset 90 rests upon the switching mechanism 50, as shown more particularly in FIG. 2B. The switching mechanism 50 detects the presence or the absence of the head band 92.

In another embodiment, as illustrated in FIG. 3, the secondary speaker 54 comprises an earphone 60. The earphone 60 of the secondary speaker 54 is generally disk-like in shape and is sized to cover a portion of an operator's ear during use. As can be viewed in FIG. 3, an earphone body 62 of the earphone 60 has a cushion 66 disposed on a surface of the earphone 62 for added comfort to the user. In another embodiment shown in FIG. 4, the earphone 62 is sized to be received within a user's ear, such as an ear bud. The ear bud has a cushion for an outer surface, providing added comfort to the user.

Referring again to FIG. 3, the secondary speaker 54 also has an attachment device 64 for connecting the speaker 54 to a position proximate to a users ear. In one embodiment, the attachment device 64 is a hook-like device for hanging the earphone 62 from the top portion of a user's ear. The hook-like attachment device 64 extends radially out from approximately a center portion of the secondary speaker 54. Constructions other than the hook-like device described above, such as a clip, that secure the secondary speaker 54 to or proximate a user are also suitable for use in the invention.

Figure 5A:
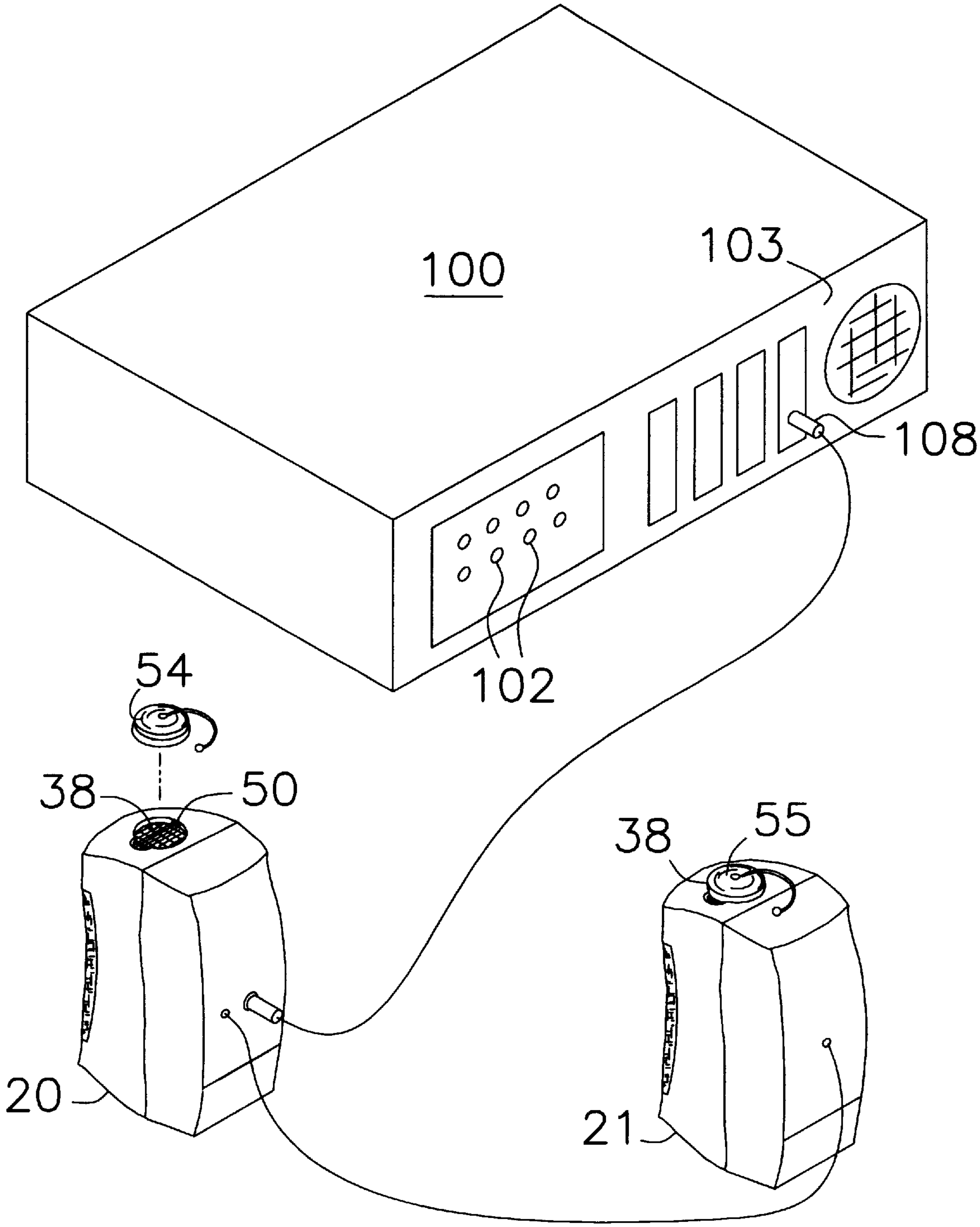
FIG. 5A is a perspective view illustrating an audio device constructed in accordance with one embodiment of the present invention.
Figure 5B:
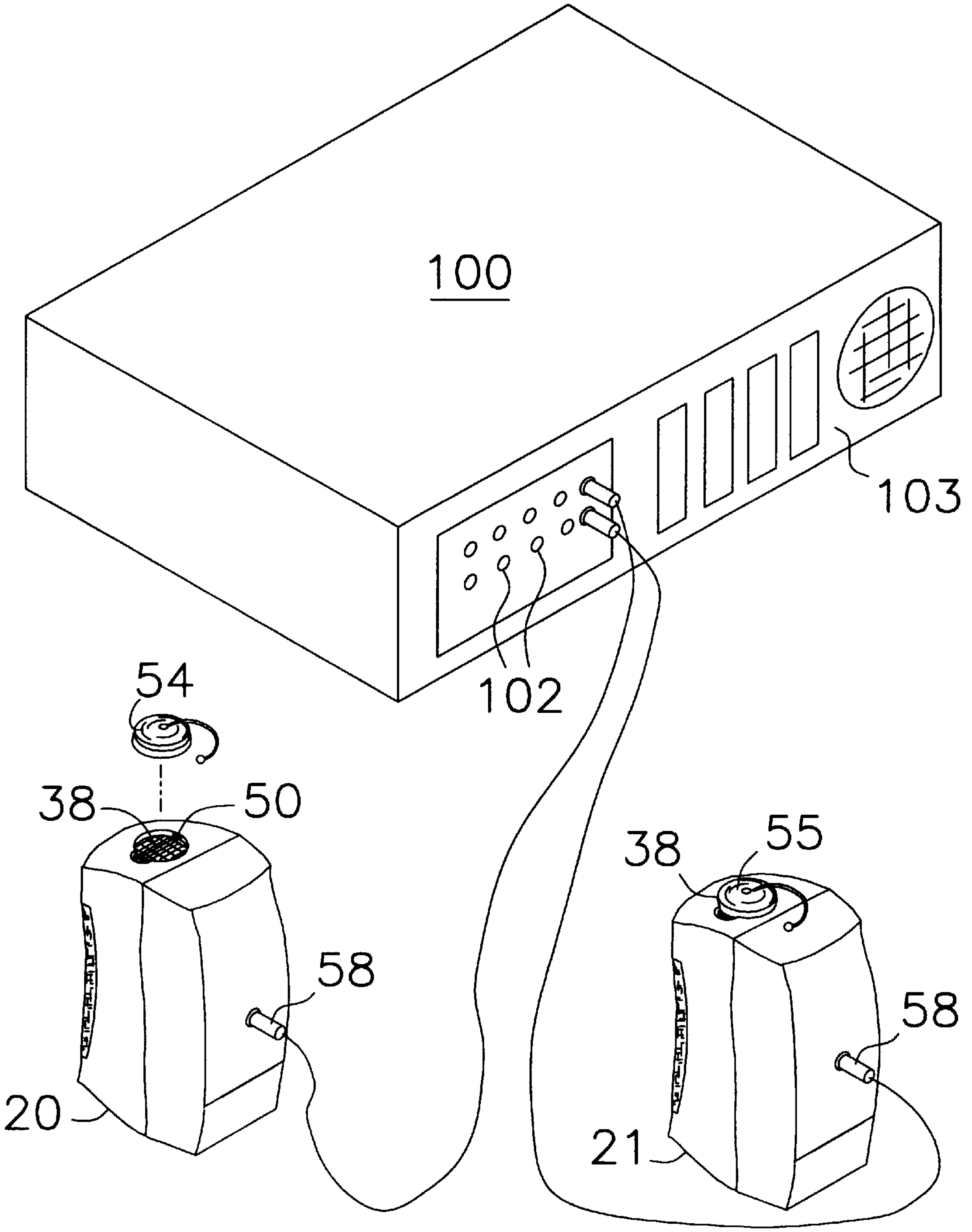
FIG. 5B is a perspective view illustrating an audio device constructed in accordance with another embodiment of the present invention.

In another embodiment, as shown in FIGS. 5A and 5B, an audio transmission apparatus 15 includes two primary speakers 20, 21 which are each connected with a device for transmitting audio signals 100. The device for transmitting audio signals 100 has a plurality of channel output devices 102. In yet another embodiment, the plurality of channel output devices 102 are located on a rear portion 103 of the device for transmitting audio signals 100. Alternatively, the plurality of channel output devices 102 can be provided on a front portion (not shown) of the device for transmitting audio signals 100.

In one embodiment, as shown in FIG. 5A, the channel output device comprises a stereo output device 108. The stereo output device 108 is connected to a first primary speaker 20. The second primary speaker 21 receives an audio signal from the first primary speaker 20. Alternatively, as shown in FIG. 5B, the channel output devices 102 provide output for a left channel at a left channel output device 104, and provide output for right channel at a right channel output device 106. The first primary speaker 20 is connected to the left channel output device 104 and the second primary speaker 21 is connected with the right channel output device 106. The device for transmitting audio signals 100 shown in FIG. 4 is a personal computer, although other types of devices for transmitting audio signals can be used in conjunction with the invention such as a stereo, television, keyboard, or a portable radio. The two primary speakers 20, 21 are used together to provide a user with sounds from the left channel output and the right channel output simultaneously. Alternatively, the user can remove the secondary speakers 54, 55 to have the earphone 60 of each speaker provide the user with sounds from the left channel output and the right channel output.

In operation, the first and second primary speakers 20, 21 of the audio transmission apparatus 10 provide the main source of sound. When enabled, the primary speakers broadcast the audio signals transmitted by the device for transmitting audio signals 100. When the primary speakers 20, 21 are disabled, the primary speakers 20, 21 then transmit the audio signals to the secondary speakers 54, 55. To switch between the primary speakers 20, 21 to the secondary speakers 54, 55, a user simply removes the secondary speakers 20, 21 from their resting position within each recess 38 of the first and second primary speakers. Removal of the secondary speakers 20, 21 triggers each switching mechanism 50 disposed within each recess 38. The actuation of the switching mechanism 50 enables each of the secondary speakers 54, 55 individually, and disables each of the primary speakers 20, 21.

Advantageously, the audio transmission apparatus provides a place to store the earphones when they are not in use. The earphones do not further clutter a desk or a drawer space, nor become displaced. Also, an operator will no longer need to fumble with cords in the rear portion of the computer to connect the earphones or the headset. The apparatus automatically enables or disables the earphones when they are removed and replaced from and to the resting position within or attached with the primary speakers. The speakers remain pleasing in appearance, and are simple to operate. A user also can easily switch from speaker use to earphone use, as necessary.

The audio transmission apparatus can be used in conjunction with a wide variety of output devices. For instance, the audio transmission apparatus can be used with a computer, a stereo system, surround sound system, portable radio, keyboard, and television. The apparatus is a quick and easy way to change between speakers and earphones or headsets. An additional feature of the apparatus is the convenient storage for the small earphones, which would otherwise become displaced.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An audio transmission apparatus for use with a system which transmits a signal through an output port, the audio transmission apparatus comprising:

- a primary speaker having a first surface, said first surface forming a portion of an outer peripheral surface of the first speaker;
- at least one secondary speaker apparatus seated with the first primary speaker on said first surface; and
- a switching mechanism disposed between the primary speaker and the secondary speaker such that removing the secondary speaker from the first surface of the primary speaker actuates the secondary speaker.

2. An audio transmission apparatus as recited in claim 1, wherein the switching mechanism disables the primary speaker upon removal of the secondary speaker apparatus.

3. An audio transmission apparatus as recited in claim 1, wherein the secondary speaker apparatus comprises an earphone.

4. An audio transmission apparatus as recited in claim 1, wherein the secondary speaker apparatus comprises a headset.

5. An audio transmission apparatus as recited in claim 1, wherein the switching mechanism comprises a micro switch.

6. An audio transmission apparatus as recited in claim 1, wherein the switching mechanism is a proximity sensor for sensing the removal of the secondary speaker apparatus.

7. An audio transmission apparatus as recited in claim 1, wherein the primary speaker is connected with the secondary speaker apparatus by a wire.

8. An audio transmission apparatus as recited in claim 7, wherein the wire is provided with a plug whereby the secondary speaker apparatus is removably connected with the primary speaker.

9. An audio transmission apparatus as recited in claim 1, wherein the primary speaker transmits audio signals to the secondary speaker apparatus by a wireless medium.

10. An audio transmission apparatus as recited in claim 1, wherein the first surface has a recess therein, the recess for receiving the secondary speaker apparatus therein.

11. An audio transmission apparatus as recited in claim 10, wherein the first surface has a cutout therein proximate to said recess, the cutout dimensioned such that an instrument can be inserted therein for removal of said secondary speaker apparatus.

12. An audio transmission apparatus for use with a system which transmits a signal through an output device, the audio transmission apparatus comprising:

- a device for transmitting audio signals having a plurality of channel output devices integrally disposed therein;
- a first primary speaker having a first surface; said first surface forming a portion of an outer peripheral surface of the first primary speaker, the first primary speaker connected with at least one of the channel output devices;
- the first surface having a first recess formed therein;
- a first switching mechanism disposed within the first recess;
- a second primary speaker having a second surface; said second surface forming a portion of an outer peripheral surface of the second speaker, the second primary speaker connected with at least one of the channel output devices;
- the second surface having a second recess formed therein;
- a second switching mechanism disposed within the second recess;
- a first secondary speaker disposed within the first recess, whereby removing the first secondary speaker from the first primary speaker actuates the first secondary speaker; and
- a second secondary speaker disposed within the second recess, whereby removing the second secondary speaker from the second primary speaker actuates the second secondary speaker.

13. The audio transmission apparatus as recited in claim 12, wherein the device for transmitting audio signals comprises a personal computer.

14. The audio transmission apparatus as recited in claim 13, wherein the personal computer has a front portion and a rear portion, and the plurality of channel output devices are disposed on the front portion of the personal computer.

15. The audio transmission apparatus as recited in claim 12, wherein the device for transmitting audio signals comprises a portable computer.

16. The audio transmission apparatus as recited in claim 12, wherein the device for transmitting audio signals comprises a stereo receiver.

17. An audio transmission apparatus as recited in claim 11, wherein the device for transmitting audio signals comprises a television.

18. An audio transmission apparatus as recited in claim 11, wherein the device for transmitting audio signals comprises a portable radio.

19. An audio transmission apparatus as recited in claim 18, wherein the first and second primary speakers are removably attached to the portable radio.

20. An audio transmission apparatus as recited in claim 11, wherein the first and second secondary speakers each comprise earphones.

21. An audio transmission apparatus as recited in claim 11, wherein the first and second recesses are each disposed in a top surface of the first and second primary speakers.

22. An audio transmission apparatus as recited in claim 11, wherein the first and second recesses are each disposed in a side surface of the first and second primary speakers.

23. An audio transmission apparatus as recited in claim 22, wherein a retaining member is disposed on both the first and second primary speakers, each retaining member disposed proximate to the first and second recesses.

24. An audio transmission apparatus for use with a system which transmits a signal, the audio transmission apparatus comprising:

- a device for transmitting audio signals having a left channel output device and a right channel output device integrally disposed therein;

a left channel desktop speaker enclosed by a first speaker body, the left channel desktop speaker connected with the left channel output device;

the first speaker body defined by a top surface, bottom surface, and side surfaces, one of the side surfaces having a grill disposed thereon, the top surface having a first recess disposed therein;

a right channel desktop speaker enclosed by a second speaker body, the right channel desktop speaker connected with the right channel output device;

the second speaker body defined by a top surface, bottom surface, and side surfaces, one of the side surfaces having grill disposed thereon, the top surface having a second recess disposed therein;

a left channel earphone enclosed by a first earphone body, the first earphone body having generally a disk shape, the left channel earphone seated within the first recess of the left channel speaker;

a right channel earphone enclosed by a second earphone body, the second earphone body having generally a disk shape, the right channel earphone seated within the second recess of the right channel speaker;

a first and second attachment device each individually connected with the first and second earphone bodies such that each of the first and second earphone bodies can be coupled with an operator's ear; and a switching mechanism disposed within both the first and second recesses, the switching mechanism for switching between the desktop speaker and the earphone when the earphone is removed from the recess.

25. The audio transmission apparatus as recited in claim 24, wherein the attachment device comprises a curved device extending from the earphone body for fastening the left and right channel earphones to an ear.

26. The audio transmission apparatus as recited in claim 24, wherein each attachment device of the earphone radially extends out from approximately a center portion of each earphone.

27. The audio transmission apparatus as recited in claim 24, wherein the left and right channel earphones each have a cushion disposed thereon thereby providing a soft surface to be placed against the operator's ear.

28. The audio transmission apparatus as recited in claim 24, wherein the switching mechanism is a micro switch.

29. The audio transmission apparatus as recited in claim 24, wherein an outer surface of the left and right channel earphones is substantially flush with the top surface of the first and second speaker bodies.

30. The audio transmission apparatus as recited in claim 24, wherein the attachment device comprises open cell foam material sized to be received by an interior portion of the ear.

31. An audio transmission apparatus for use with a system which transmits a signal, the audio transmission apparatus comprising:

a device for transmitting audio signals having a stereo output device integrally disposed therein;

a first primary speaker enclosed by a first speaker body, the first primary speaker coupled with the stereo output device;

the first speaker body defined by a top surface, bottom surface, and side surfaces, one of the side surfaces having a grill disposed thereon, the top surface having a first recess disposed therein;

a second primary speaker enclosed by a second speaker body, the second primary speaker coupled with the first primary speaker;

the second speaker body defined by a top surface, bottom surface, and side surfaces, one of the side surfaces having grill disposed thereon, the top surface having a second recess disposed therein;

a left channel earphone enclosed by a first earphone body, the first earphone body having generally a disk shape, the left channel earphone seated within the first recess of the first primary speaker;

a right channel earphone enclosed by a second earphone body, the second earphone body having generally a disk shape, the right channel earphone seated within the second recess of the second primary speaker;

a first and second attachment device each individually connected with the first and second earphone bodies such that each of the first and second earphone bodies can be coupled with an operator's ear; and a switching mechanism disposed within both the first and second recesses, the switching mechanism for switching between the primary speaker and the earphone when the earphone is removed from the recess.

* * * * *